United States Patent [19]
Enokido et al.

[11] Patent Number: 5,461,672
[45] Date of Patent: Oct. 24, 1995

[54] PORTABLE RADIO TELEPHONE HAVING A SLIDABLE SPEAKER UNIT

[75] Inventors: Kazuhiro Enokido, Kanagawa; Akio Suzuki, Tokyo; Shigeru Iwasaki, Kanagawa, all of Japan

[73] Assignee: Sony Corporation, Tokyo, Japan

[21] Appl. No.: 92,213

[22] Filed: Jul. 15, 1993

[30]     Foreign Application Priority Data

Jul. 22, 1992 [JP] Japan ........................... 4-216443

[51] Int. Cl.⁶ ................................................ H04M 1/00
[52] U.S. Cl. ............................................ 379/433; 379/434
[58] Field of Search ................................. 379/433, 428, 379/58, 434; 455/89, 90

[56]         References Cited

U.S. PATENT DOCUMENTS

| | | | |
|---|---|---|---|
| 4,272,655 | 6/1981 | MacKenzie et al. | 379/433 |
| 5,278,993 | 1/1994 | Reiff et al. | 379/433 |

FOREIGN PATENT DOCUMENTS 389676 10/1990 European Pat. Off. ............. 379/428

*Primary Examiner*—Jeffery A. Hofsass
*Assistant Examiner*—Jack Chiang
*Attorney, Agent, or Firm*—Limbach & Limbach

[57]             ABSTRACT

A portable radiotelephone transmits and receives voice information signals to and from a telephone base station by radio. The radio telephone includes a telephone main body having a key pad section mounted on its outer surface and containing a microphone unit. A speaker housing containing a speaker unit is slidably mounted on the telephone main body. A switching unit located between the telephone body and the speaker housing establishes electrical connection and disconnection between the telephone body and the speaker housing depending upon their relative positions as changed by sliding the speaker unit. Electrical connection is established when the speaker housing is moved in a direction away from the microphone unit located on the telephone main body.

8 Claims, 13 Drawing Sheets

PORTABLE RADIO TELEPHONE HAVING A SLIDABLE SPEAKER UNIT

BACKGROUND OF THE INVENTION

1. Field of the Invention

This invention relates to portable radiotelephone and, more particularly, to a radiotelephone which enables the distance between a microphone unit and a speaker unit to be changed in a predetermined manner.

2. Description of the Related Art

It has been known in the prior art to employ a portable radiotelephone for transmitting voice signals to a telephone base station by radio, that is without interconnecting wires, receiving the voice signals transmitted from the telephone base station, without interconnecting wires and outputting the received signals as a voice output.

The portable radiotelephone is made up of a microphone unit for collecting the voice, a transmitting unit for modulating the voice signals collected by the microphone unit for transmission via a transmission/reception antenna to the telephone base station, a receiving unit for receiving and processing the signals transmitted from the base station via the transmission/reception antenna, and a speaker unit for transducing the voice signals received by the receiving unit into voice.

For portability, the radiotelephone has its transmitting unit inclusive of the microphone unit and its receiving unit inclusive of the speaker unit contained in a one-piece telephone housing or telephone main body. The microphone unit, contained in the telephone housing, is placed so that when the sound radiating surface of the speaker unit, arranged towards one side of the telephone housing, is placed in the vicinity of the user's external ear, the sound collecting surface of the microphone unit is located in the vicinity of the user's mouth. That is, the speaker unit and the microphone unit are arranged within the telephone housing at a distance from each other approximately equal to the distance between the external ear and the mouth of the user. The speaker unit and the microphone unit are placed relative to each other in this manner so that the user may hear the voice received and radiated from the speaker unit while the speech of the user may positively be collected by the microphone unit during signal transmission/reception.

The radiotelephone in which the microphone unit and the speaker unit are contained in this manner within the one-piece housing cannot be reduced sufficiently in size because of the restraint imposed by the distance between the external ear and the mouth of the user, even although attempts have been made to reduce the size of the electronic circuit of the transmitting unit and the receiving unit.

In order to overcome such deficiency, there has been proposed a portable radiotelephone as described for example in JP Patent KOKAI Publication No.2-44843 (laid open on Feb. 14, 1990), corresponding to U.S. Pat. No. 4,845,772. With the radiotelephone, proposed therein, a microphone housing, having the microphone unit contained therein, is pivotally mounted via a hinge at one end of a telephone main body comprising a receiving section inclusive of the speaker unit and an electronic circuit as well as a keypad having a number of dial keys. The microphone housing is rotated via the hinge for folding or unfolding the microphone housing with respect to the telephone main body. The microphone housing has a size selected so as to cover the key pad, having the dial keys, provided on the front surface of the telephone main body, when the microphone housing is folded onto the telephone main body.

With the radiotelephone in which the microphone housing is mounted on the telephone main body via the hinge, the distance between the speaker unit and the microphone unit may be rendered approximately equal to the distance between the external ear and the mouth of the user by unfolding the microphone housing from the main body of the telephone only on the occasion of signal transmission and reception. Since the microphone housing may be folded onto the telephone main body, the radiotelephone may be reduced in size without any limitations imposed by the distance between the external ear and the mouth of the user.

When in the folded state, the radiotelephone is reduced to a pocketable size with convenience for transport. However, for signal transmission and reception, the microphone housing is turned via the hinge so as to be unfolded from the main body of the telephone. Since the microphone housing has a larger surface measure and is moved a larger distance relative to the telephone main body, the microphone housing is susceptible to impact by being impinged upon external objects. If such impact is applied to the microphone housing, it becomes difficult to compensate for the loss of the mechanical strength incurred to the microphone housing. That is, since the microphone housing is simply connected to the main body of the telephone via the hinge, the hinge is stressed concentratedly under the external impact applied from outside to the microphone housing, with the result that the hinge tends to be destructed easily.

Additionally, means for providing electrical connection between the electronic circuit for e.g. the transmitting section provided within the telephone main body and the microphone unit contained in the microphone housing becomes complex in structure because of the complicated construction of an electrical contact responsible for electrical connection and disconnection of rotating portions.

With the radiotelephone in which the microphone housing is collapsibly connected to the telephone housing via the hinge, it may be contemplated to interconnect the electronic circuit section provided in the telephone main body and the microphone unit contained in the microphone housing via a flexible printed circuit board. However, since the flexible printed circuit board is partially introduced into the hinge in such case, the electrical components soldered to the flexible circuit board may tend to be peeled off due to soldering failure connection under mechanical vibrations each time the microphone housing is rotated, thus detracting from operational reliability.

OBJECTS AND SUMMARY OF THE INVENTION

It is therefore an object of the present invention to provide a portable radiotelephone in which the distance between the speaker unit and the microphone unit is rendered variable without employing a hinge to enable the telephone housing to be reduced in size when the telephone is not used, that is when conversation is not made over the radiotelephone.

It is another object of the present invention to provide a portable radiotelephone exhibiting high durability by assuring a sufficient mounting strength of the speaker housing containing the speaker unit therein with respect to the telephone housing.

It is yet another object of the present invention to provide a portable radiotelephone exhibiting sufficient operational reliability by assuring positive connection and disconnection between the speaker unit and the electronic circuitry provided within the telephone housing responsive to the sliding of the speaker housing.

For achieving these objects, the present invention provides a portable radiotelephone in which a microphone unit is contained in a telephone main body having dial keys on its outer surface. The radiotelephone includes a speaker housing having a speaker unit contained therein and slidably mounted on the telephone main body to provide for a variable distance between the microphone unit and said speaker unit, and switching means provided between the telephone main body and the speaker housing for assuring electrical connection and disconnection depending on sliding movement of the speaker housing relative to the telephone main body.

With the portable radiotelephone of the present invention, the electrical contact at the switching means is made when the speaker housing is slid relative to the telephone main body in the direction of increasing the distance between the microphone unit contained in the telephone main body and the speaker unit contained in the speaker housing for establishing electrical connection between the speaker unit and the telephone main body.

Also, with the portable radiotelephone of the present invention, changeover means for changing over a control switch provided in the telephone main body is provided in the speaker housing.

With the portable radiotelephone of the present invention, the distance between the speaker unit contained in the speaker housing and the microphone unit contained in the telephone main body may be changed by manually sliding the speaker housing relative to the telephone main body. The electrical connection and disconnection of the switching means adapted for assuring electrical connection between the speaker unit and the telephone main body may be achieved by such sliding movement of the speaker housing relative to the telephone main body.

On the other hand, the electrical connection between the speaker units and the telephone main body may be realized upon sliding the speaker housing in the direction of increasing the distance between the microphone unit contained in the telephone main body and the speaker unit contained in the speaker housing.

Also, a control switch for controlling the operating modes of the radiotelephone is actuated on sliding the speaker housing relative to the telephone main body to permit selection of one of the transmission/reception enable state and the standby state.

Other objects and advantages of the present invention will become apparent from the following detailed description of preferred embodiments and the claims.

DETAILED DESCRIPTION OF PREFERRED EMBODIMENTS

Figure 1:
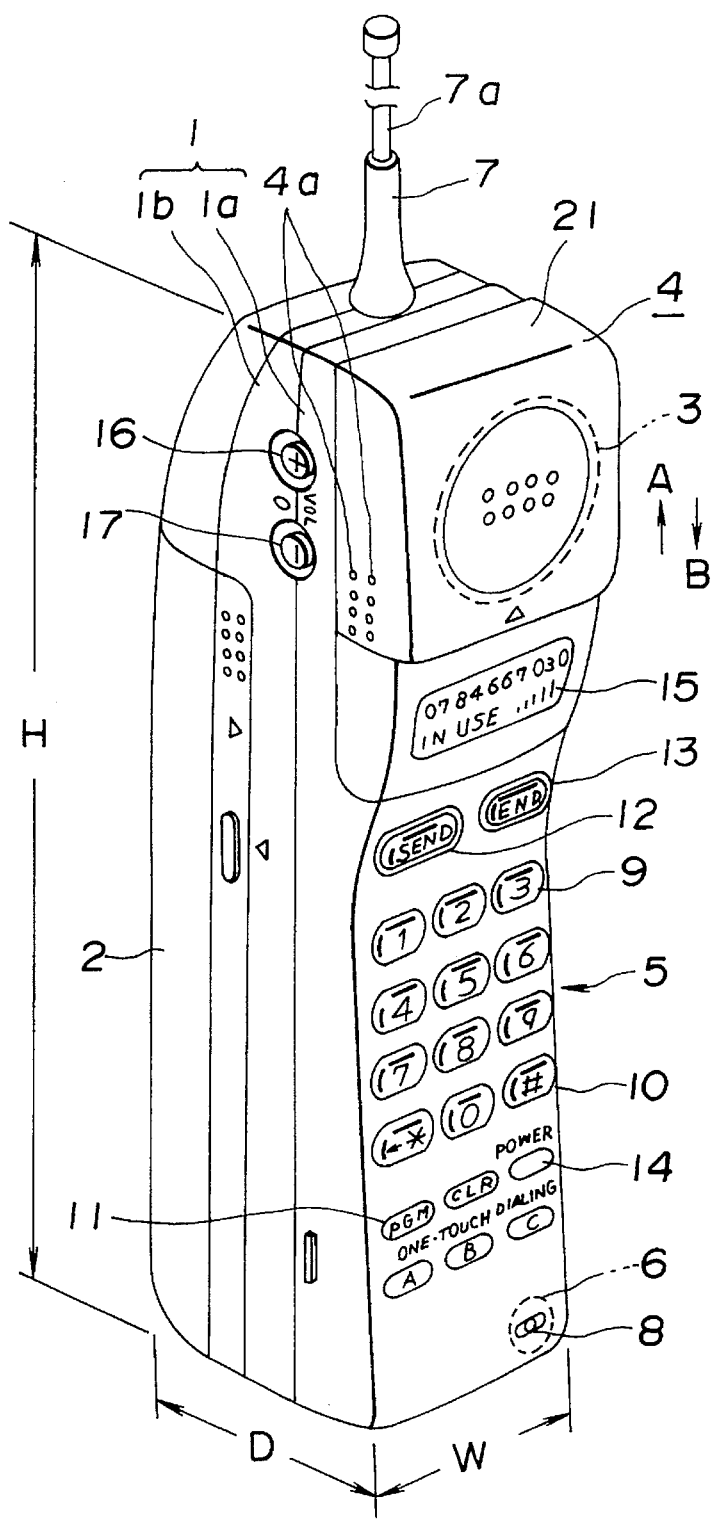
FIG. 1 is a perspective view showing a portable radiotelephone according to the present invention.

Referring to FIG. 1, the radiotelephone according to the present invention is made up of a telephone main body 1, a battery pack 2 removably mounted on the telephone main body 1 for supplying electrical power to the telephone main body 1 and a speaker housing 4 containing a speaker unit 3 therein and mounted slidably on the telephone main body 1.

The telephone main body 1, constituting the portable radiotelephone, is made up of an upper half 1a and a lower half 1b, both molded from synthetic resin and connected to each other to form a hand-held unit. The portable radiotelephone of the illustrated embodiment is rectangular in contour with a width W of approximately 40 mm, a height H of approximately 150 mm and a thickness D, with the battery pack 2 attached to its back side, of approximately 33.5 mm, as shown in FIG. 1.

Within the telephone main body 1, there is contained a printed circuit board having electronic circuit components and control circuit components mounted thereon for controlling the operating modes of the radiotelephone. The electronic components make up a transmitting section for transmitting voice signals collected by the microphone unit 6 contained in the telephone main body 1 to the telephone base station and a receiving section for receiving the voice signals transmitted from the telephone base station.

A key pad section 5 is mounted on the front side of the telephone main body 1, as shown in FIG. 1. On the key pad section 5, there are arrayed dial keys 9 from 1 to 0, a function select key 10 for selecting compacted dialing, a program key 11 for performing a compacted dialing operation, a transmission key or send key 12 for signal transmission, a transmission/reception end key 13 and a power key 14 for controlling the power supply. A display section 15 for displaying the dial numbers and operating modes for transmission and reception is mounted on the front side of the main telephone body 1.

On the upper end face of the telephone main body 1 is mounted a transmission/reception antenna 7 for transmitting the collected voice signals and receiving voice signals transmitted from the telephone base station. The transmission/reception antenna 7 is a rod antenna made up of plural connecting rods 7a interconnected for extension and contraction. The transmission/reception antenna 7 is connected to the telephone main body 1 by having its proximal part secured within the main telephone body 1 and by having the extensible connecting rod 7a protruded from the upper end face of the telephone main body 1.

The microphone unit 6 is arranged at the lower right-hand side of the telephone main body 1, fitted with the transmission/reception antenna 7, as shown in FIG. 1. A sound collecting hole 8 is bored at a portion in the telephone main body 1 facing the microphone unit 6.

On one lateral side of the telephone main body 1, near its upper end, a sound volume increasing button 16 and a sound volume decreasing button 17 are provided in a side-by-side relation on a left-hand side plate when viewed in FIG. 1, for adjusting the sound volume of the speaker unit 3.

Figure 3:
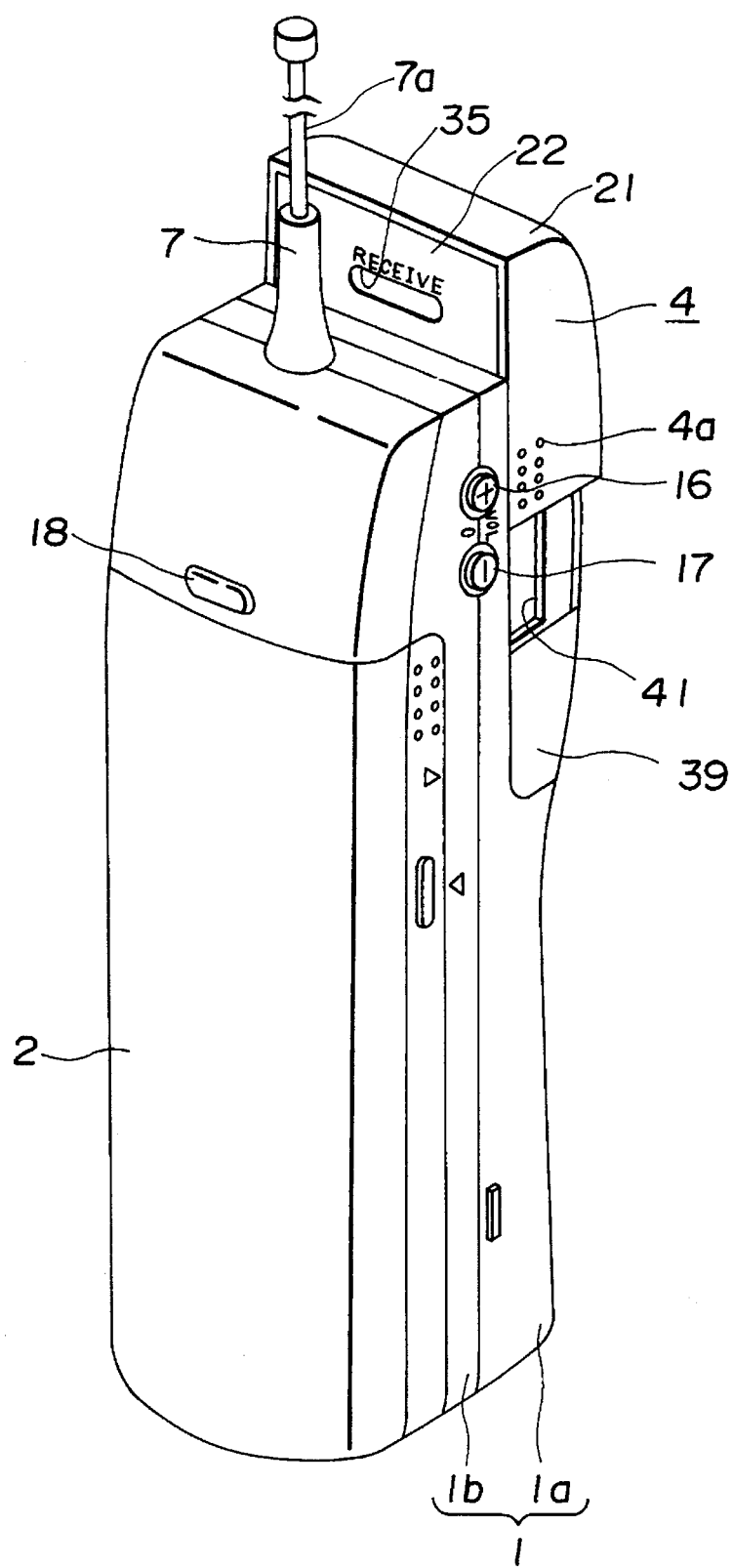
FIG. 3 is a perspective view, as seen from the back side, of the radiotelephone shown in FIG. 1, with the speaker housing protruding from the telephone housing.

On the back side of the telephone main body 1, there is detachably mounted a battery pack 2 by having its engaging pawl engaged in a mating engaging portion provided on the back side of the telephone main body 1 and by having its mating locking portion locked by a locking portion provided on the telephone main body 1. The battery pack 2 may be detached from the telephone main body 1 by thrusting an unlocking button 18 provided on the back side of the telephone main body 1 as shown in FIG. 3 for unlocking the locking portion from the mating locking portion.

By detachably mounting the battery pack 2 in this manner on the main telephone body 1, a battery pack having a sufficient power may be exchanged for a used-up battery pack to assure a stable operating state of the radiotelephone.

Figure 2:
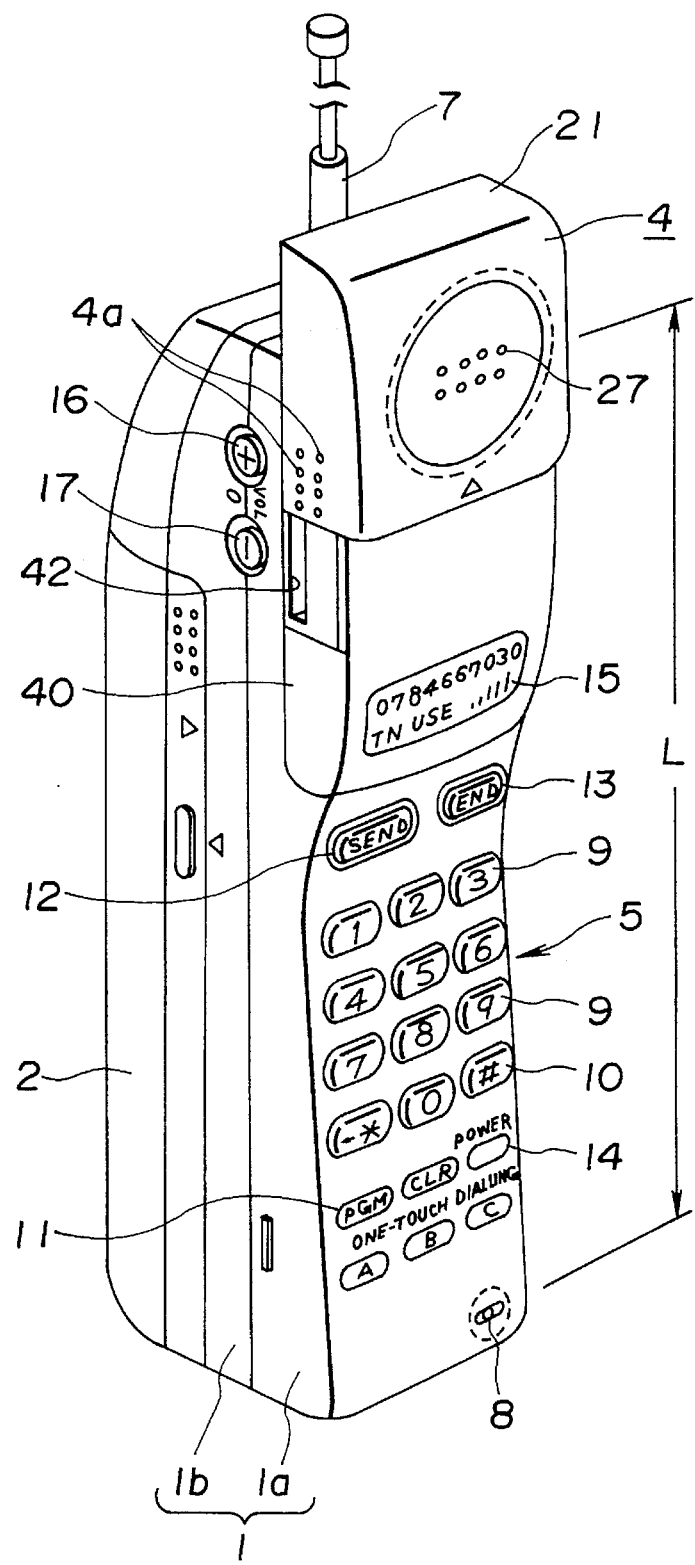
FIG. 2 is a perspective view of the radiotelephone shown in FIG. 1, with a speaker housing protruding from the telephone housing.

The speaker housing 4, containing the speaker unit 3 therein, is slidably mounted on the upper end of the above-described telephone main body 1. That is, the speaker housing 4 may be slid in the longitudinal direction of the telephone main body 1, as indicated by arrows A and B in FIG. 1, such that, when the speaker housing is slid in the direction shown by arrow A in FIG. 1, it is protruding at its one end from the main telephone body 1, as shown in FIGS. 2 and 3, whereas, when the speaker housing is slid in the direction shown by arrow B, it is brought to a position in which its outer surface is flush with the outer surface of the telephone main body 1.

Figure 4:
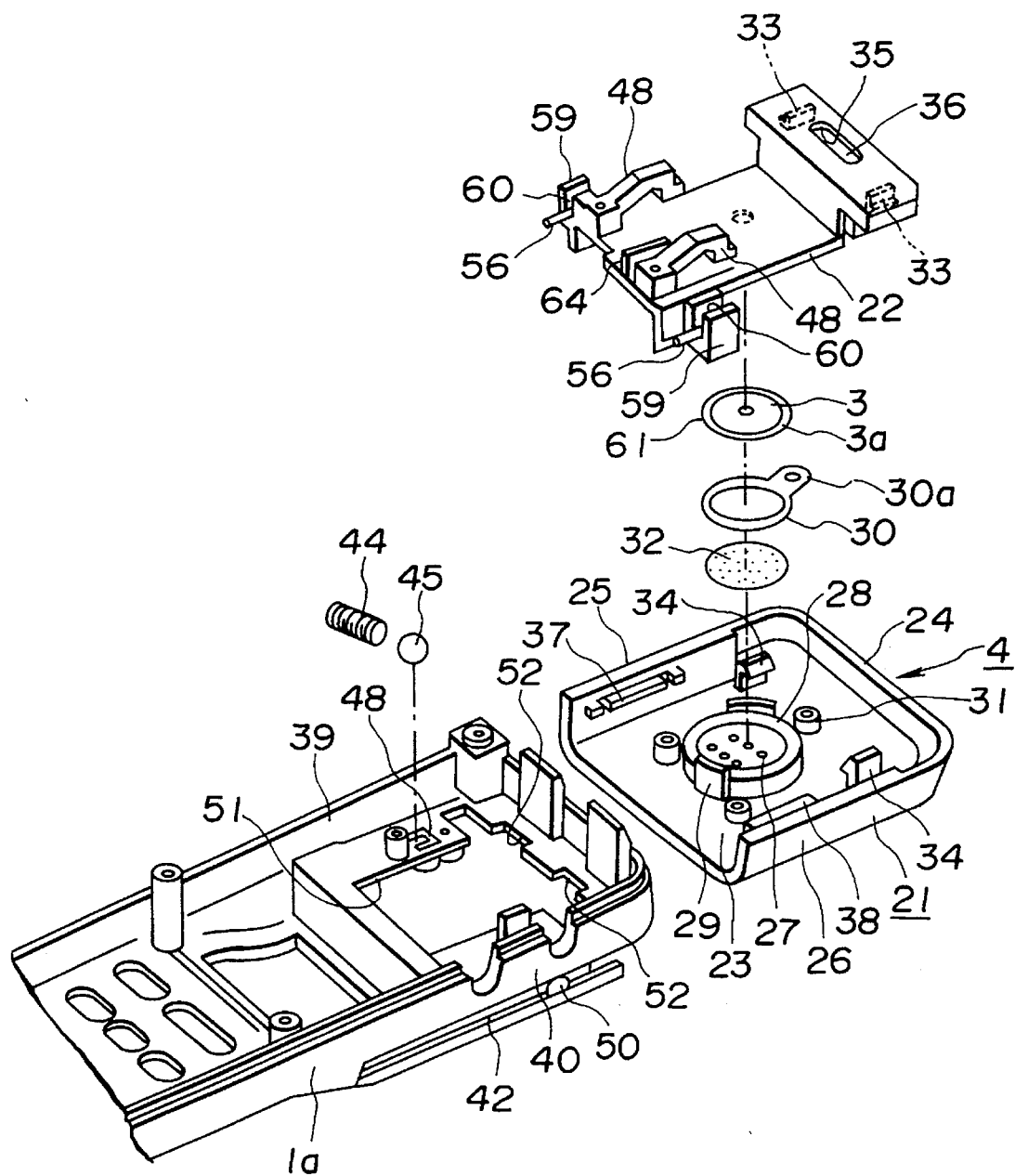
FIG. 4 is an exploded perspective view showing the speaker housing slidably mounted on the telephone main body.

The speaker housing 4, slidably mounted in this manner on the telephone main body 1, is made up of a speaker unit container 21, containing the speaker unit 3 therein, and a speaker unit retention plate 22 for thrusting and supporting the speaker unit 3 contained in the speaker unit container 21 for preventing the speaker unit 3 from becoming detached from the speaker unit container, as shown in FIG. 4.

The speaker unit container 21 of the speaker housing 4 is recessed on the whole and includes upstanding side plates 24, 25 and 26 on an upper side and opposite lateral sides of a rectangular major surface 23, respectively, with the lower side opposite to the Upper side being opened, as shown in FIG. 4.

The major surface 23 of the speaker unit container 21 is formed with plural sound dissipating holes 27 for dissipating the voice radiated from the speaker unit 3 contained in the speaker unit container 21 to outside. The major surface 23 is also formed with an annular upstanding speaker unit supporting protrusion 28 for surrounding the sound radiating holes 27. The speaker unit 3 is contained within the speaker unit container 21 with its sound radiating surface facing the sound dissipating holes 27 and with its outer flange 3a resting on the speaker unit supporting protrusion 28. A plurality of position-regulating lugs 29 are formed around the speaker unit supporting protrusion 28 for supporting the outer periphery of the flange 3a for regulating the mounting position of the speaker unit 3 relative to the speaker unit container 21.

A substantially annular spacer 30, formed of an elastic material, such as rubber, is interposed between the flange 3a of the speaker unit 3 and the speaker unit supporting protrusion 28. The spacer 30 has an engaging tongue 30a at its one end which is engaged by an engaging boss 31 formed on the inner major surface 23 so that the annular spacer is caused to rest on the position-regulating lugs 29.

On the inner major surface 23, formed with the sound radiating holes 27, a dust net 32 formed e.g. by a cloth is placed for preventing dust and dirt from intruding via the sound radiating holes 27 into the inside of the speaker housing 4.

The speaker unit retention plate 22 thrusting and supporting the speaker unit 3 mounted within the speaker unit container 21 is designed as a flat plate dimensioned to cover both the speaker unit 3 and the inner surface of the speaker unit container 21 which is protruded from the main telephone body 1 when the speaker housing 4 is slid so as to be protruded relative to the telephone main body 1 as shown in FIG. 3. The speaker unit retention plate 22 has a pair of flexible mating engaging pawls 33 formed upright on its surface opposite to the major surface 23 of the speaker unit container 21, and is mounted on the speaker unit container 21 by having the mating engaging pawls 33 engaged with a pair of engaging pawls 34, 34 formed upright on the inner major surface 23 of the speaker unit container 21 for thrustingly supporting the speaker unit 3 having its flange 3a set on the speaker unit supporting protrusion 28.

The speaker unit retention plate 22 is formed with a sound radiating hole 35 for radiating the voice emanated from the back side of the speaker unit 3 thrustingly supported and covered by the retention plate 22 to outside of the speaker housing 4. The sound radiating hole 35 is provided for facing outside of the telephone main body 1 when the speaker housing 3 is slid so as to be protruded relative to the telephone main body 1, as shown in FIG. 2. A concealing plate 36 is provided at some distance from and opposite to the sound radiating hole 35 to conceal the interior of the speaker housing 4 from view from the outside.

The speaker housing 4, mounted in this manner with the speaker unit 3 contained in the speaker unit container 21 thrustingly supported by the speaker unit retention plate 22, is slidably mounted on the telephone main body 1 by having slide guide lugs 37, 38 formed upright on the inner lateral sides of the upstanding side plates 25, 26 of the speaker unit container 21 engaged in slide guide grooves 41, 42 formed in opposite lateral sidewall sections 39, 40 of the telephone main body 1. Meanwhile, the outer lateral surfaces of the upstanding side plates 25, 26 are formed with retention bosses 4a.

The slide guide grooves 41, 42 for slidingly guiding the speaker housing 4 are formed over a part of the longitudinal length of the sidewall sections 38, 40 so as to be opened towards the upper lateral side of the telephone main body 1. By having the slide guide grooves 41, 42 formed in this manner, the speaker unit container 21 is mounted on the telephone main body 1 by inserting and engaging the slide guide lugs 37, 38 in the slide guide grooves 41, 42 from the upper side of the telephone main body 1. Consequently, the speaker housing 4 is mounted for shielding the upper front side of the telephone main body 1 by the speaker unit container 21, as shown in FIG. 1.

The telephone main body 1 and the speaker housing 4 are provided with a click mechanism 43 for holding the speaker housing 4 by snap engagement not only at a position in which the speaker housing 4 is receded to a position flush with the outer surface of the telephone main body 1 as shown in FIG. 1 but also at a position in which the speaker housing 4 is protruding out of the telephone main body 1 as shown in FIG. 2. This click mechanism 43 includes steel balls 45 thrust by coil springs 44 provided on the telephone main body 1 and first and second engaging grooves 46, 47 formed in the speaker housing 4 so as to be engaged by the steel balls 45.

Figure 5:
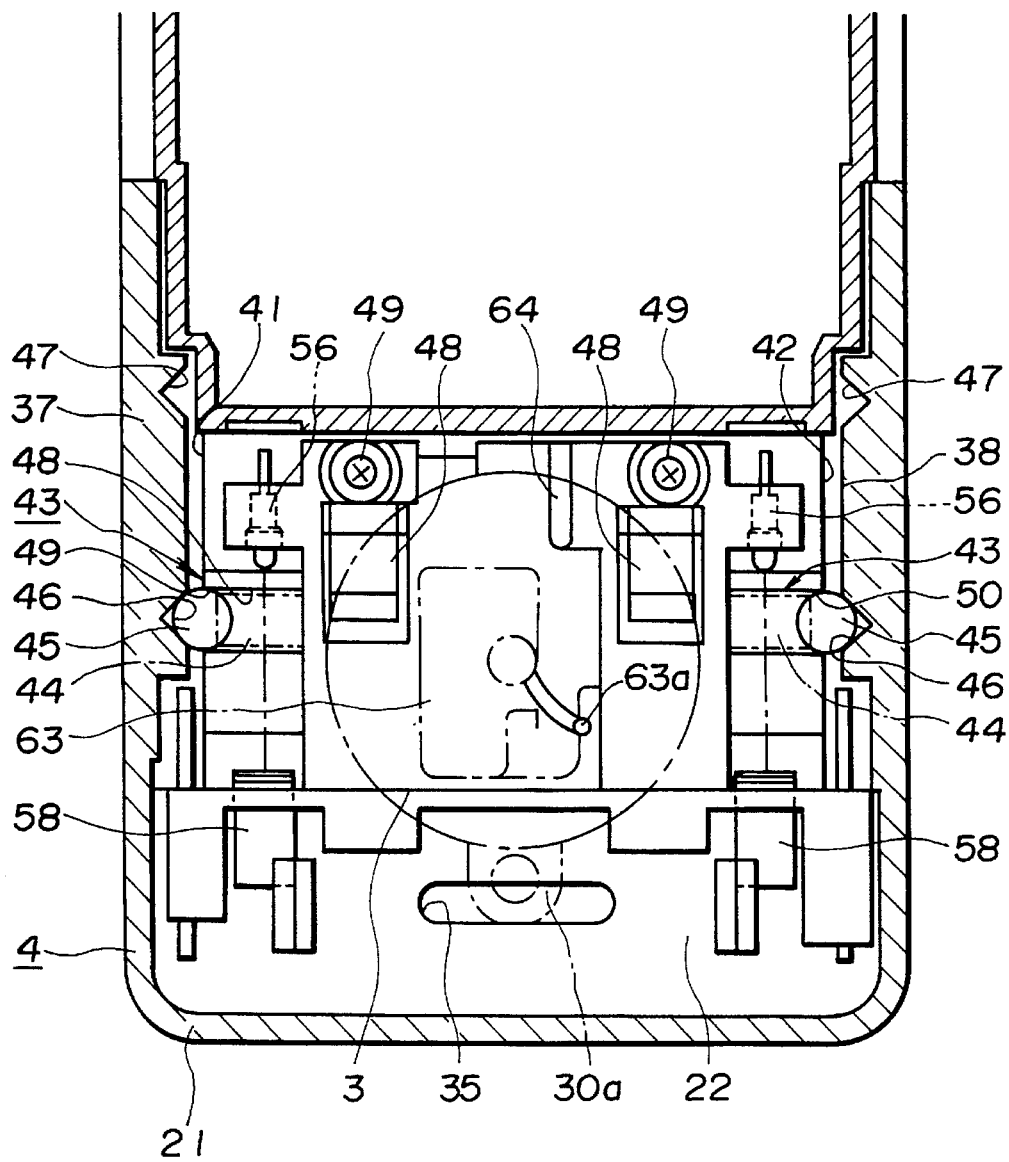
FIG. 5 is a cross-sectional plan view showing the speaker housing when caused to descend towards the telephone main body.

The coil spring 44 and the steel ball 45 are contained in a holding recess 48 formed in each of the inner lateral surfaces of the sidewall sections 39, 40 as shown in FIGS. 4 and 5. The steel balls 45, placed within the recesses 48 under the force of the coil springs 44, are partially protruded out of the sidewall sections 39, 40 via through-holes 49, 50 formed in the sidewall sections 39, 40, respectively.

The first and second engaging grooves 46, 47 of the speaker housing 4 are formed as vee notches in the inner lateral surfaces of the upstanding side plates 25, 26 of the speaker unit container 21. These grooves 46, 47 are formed as a pair in each of the slide guide lugs 37, 38 formed upright on the inner lateral sides of the upstanding side plates 25, 26 of the speaker unit container 21. The first guide grooves 46 are formed at the positions of being engaged by the steel balls 45, biased by coil springs 44, as shown in FIG. 5, when the speaker housing 4 is receded towards the telephone main body 1 as shown in FIGS. 1 and 5. On the other hand, the second guide grooves 47 are formed at the positions of being engaged by the steel balls 45, biased by coil springs 44, as shown in FIG. 6, when the speaker housing 4 is slid to a position protruding out of the telephone main body 1 as shown in FIGS. 2 and 3.

Figure 6:
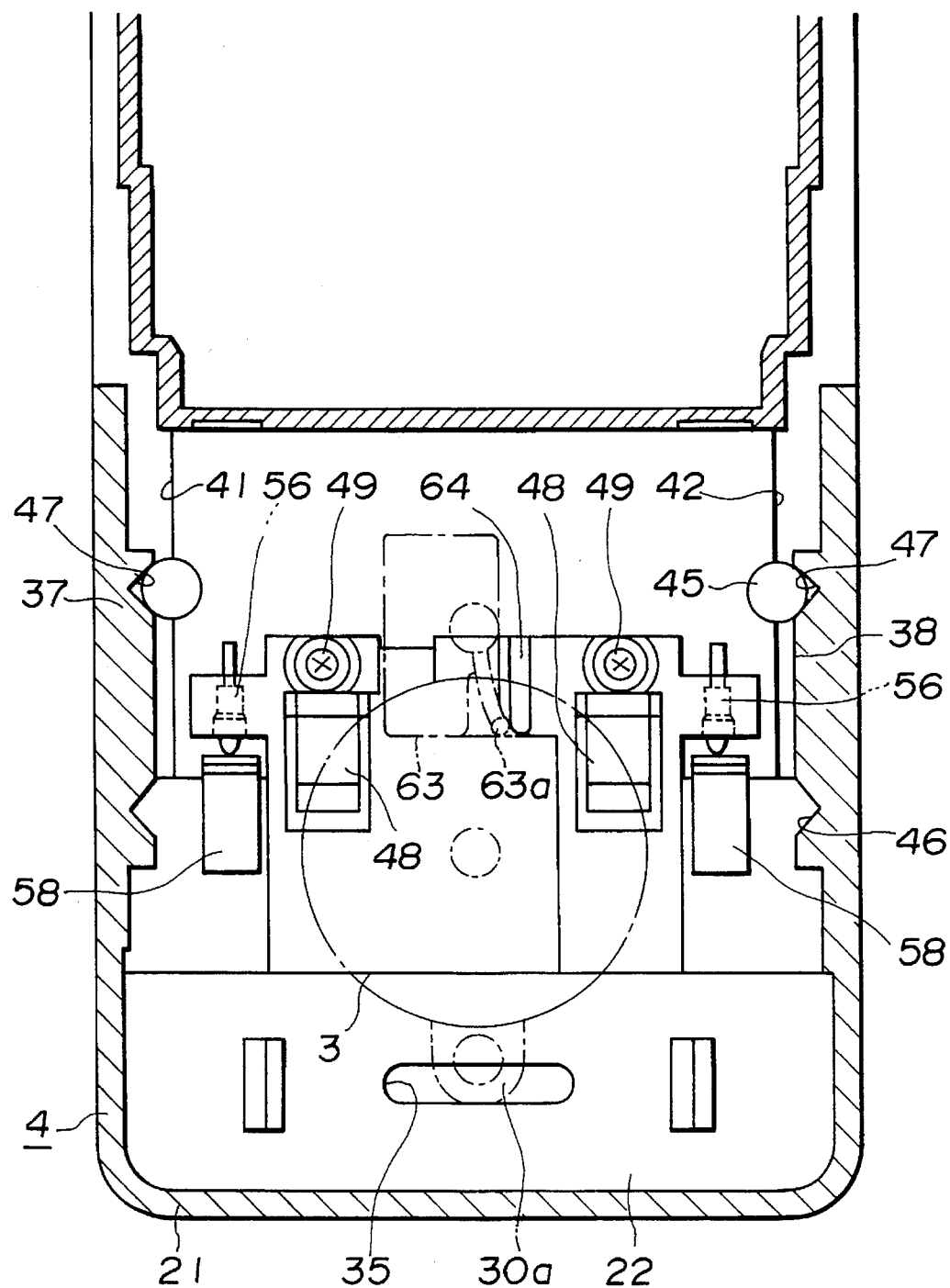
FIG. 6 is a cross-sectional plan view showing the speaker housing protruding from the telephone main body.

By having the steel balls 45 arranged on the side telephone main body 1, and by providing the first and second engaging grooves 46, 47 on the side speaker housing 4, the steel balls 45 are snap-engaged in the first and second engaging grooves 46, 47 in the position in which the speaker housing intrudes into the telephone main body 1 and in the position in which it protrudes from the telephone main body 1, respectively, as shown in FIGS. 5 and 6.

Figure 7:
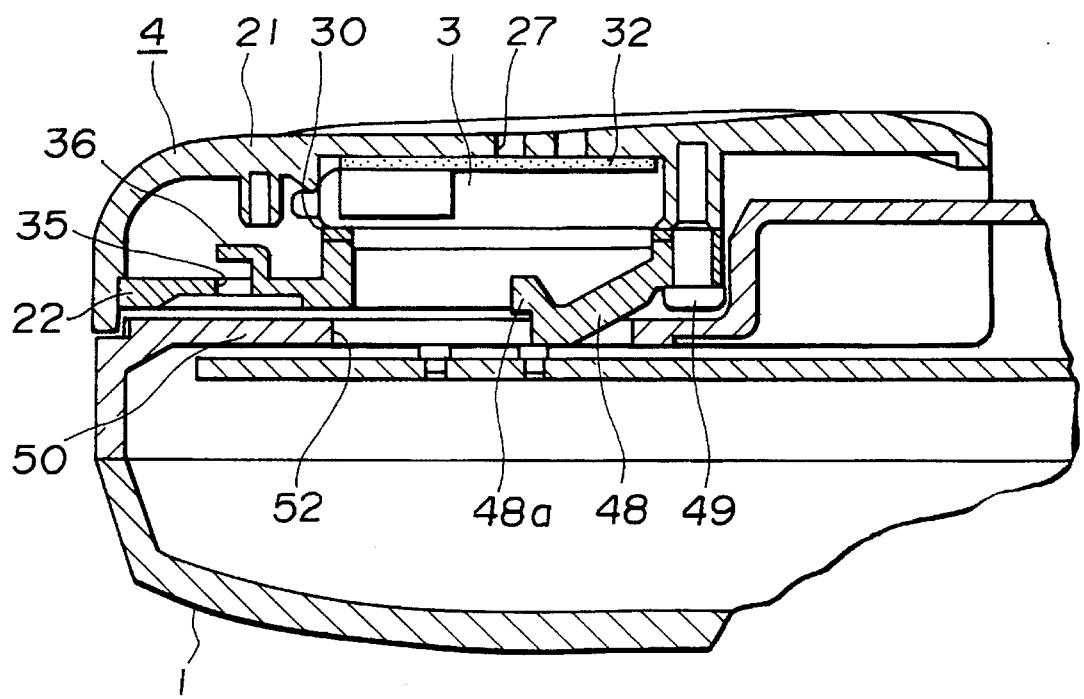
FIG. 7 is a cross-sectional side view showing the speaker housing when caused to descend towards the telephone main body.
Figure 8:
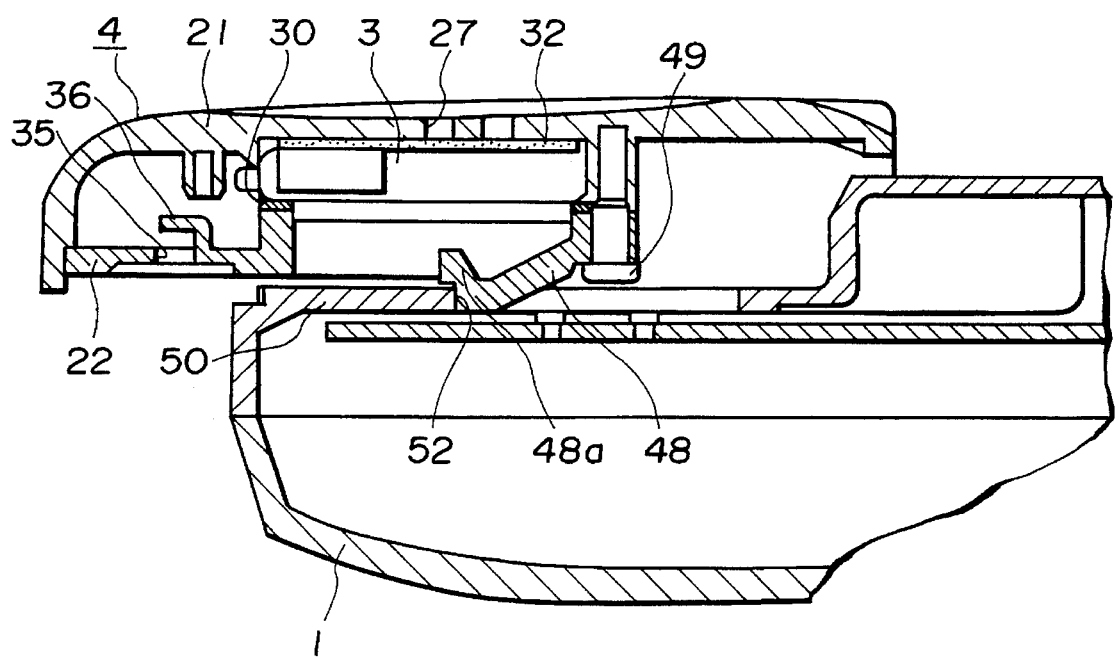
FIG. 8 is a cross-sectional side view showing the speaker housing protruding from the telephone main body.

The speaker housing 4 is provided with a pair of detachment inhibiting elements 48 for preventing the speaker housing 4 from being detached out of the telephone main body 1. These detachment inhibiting elements 48 are mounted on the back side of the speaker unit retention plate 22 as shown in FIGS. 5 and 7 by having the proximal sides thereof secured to the back side of the speaker unit retention plate 22 by set screws 49. These detachment inhibiting elements 48 have their distal ends 48a bent for protruding into the inside of the telephone main body 1, so that, when the speaker housing 4 is slid in the direction of protruding out of the telephone main body 1, as shown in FIG. 8, the ends 48a of the elements 48 are engaged in engaging recesses 52 formed on the edges of openings 51, formed in turn by partially removing a front wall 50 of the telephone main body 1, for preventing the speaker housing 4 from being detached from the telephone main body 1.

Figure 9:
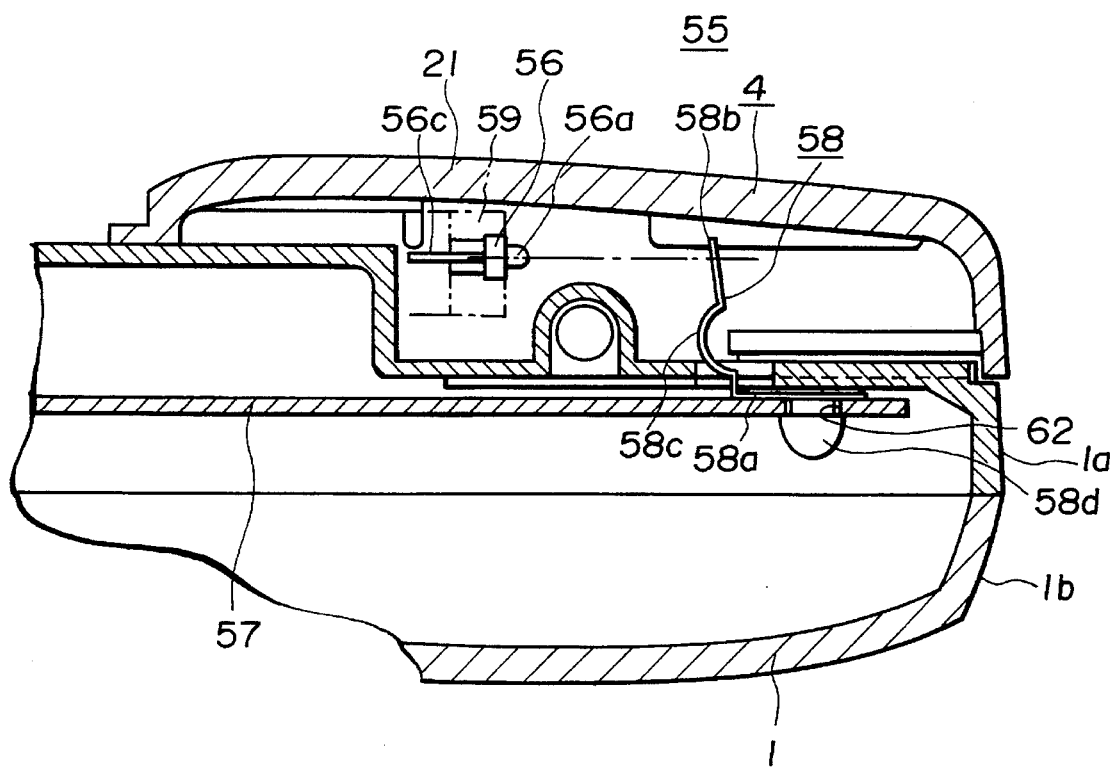
FIG. 9 is a cross-sectional side view showing the relation between a probe pin of the speaker housing and a connecting terminal of the telephone main body when the speaker housing is caused to descend towards the telephone main body.
Figure 11:
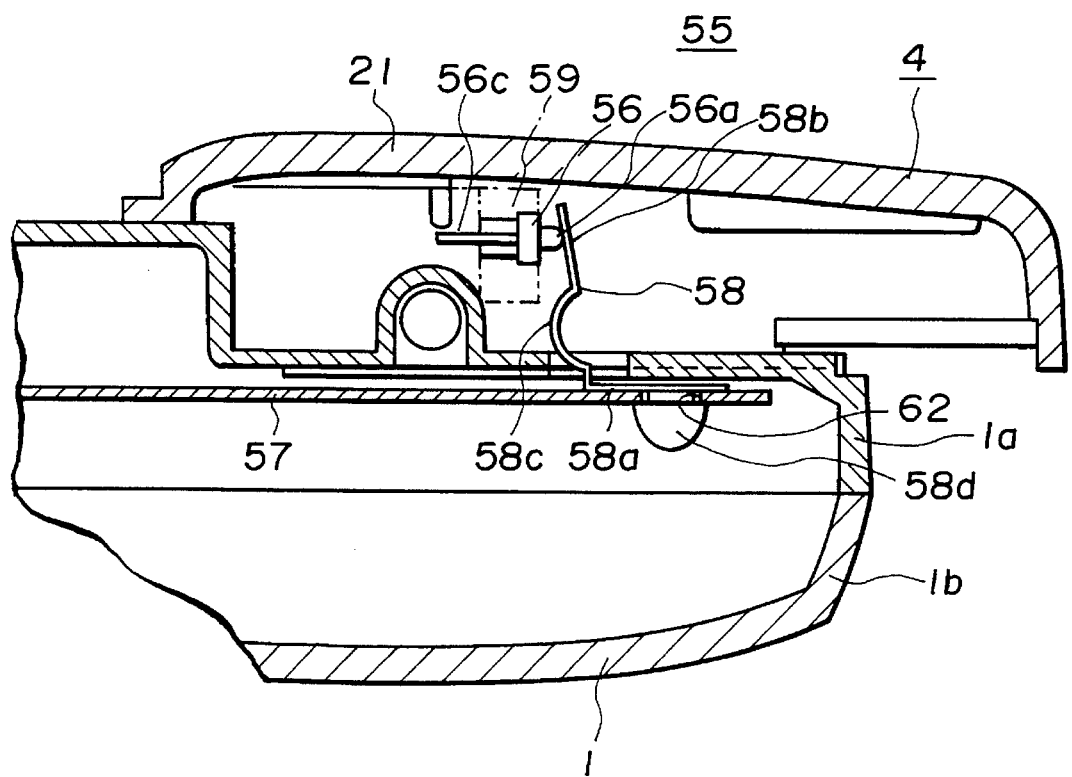
FIG. 11 is a cross-sectional side view showing the state in which the speaker housing is protruding from the telephone main body and the probe pin is contacted by the connection terminal.
Figure 12:
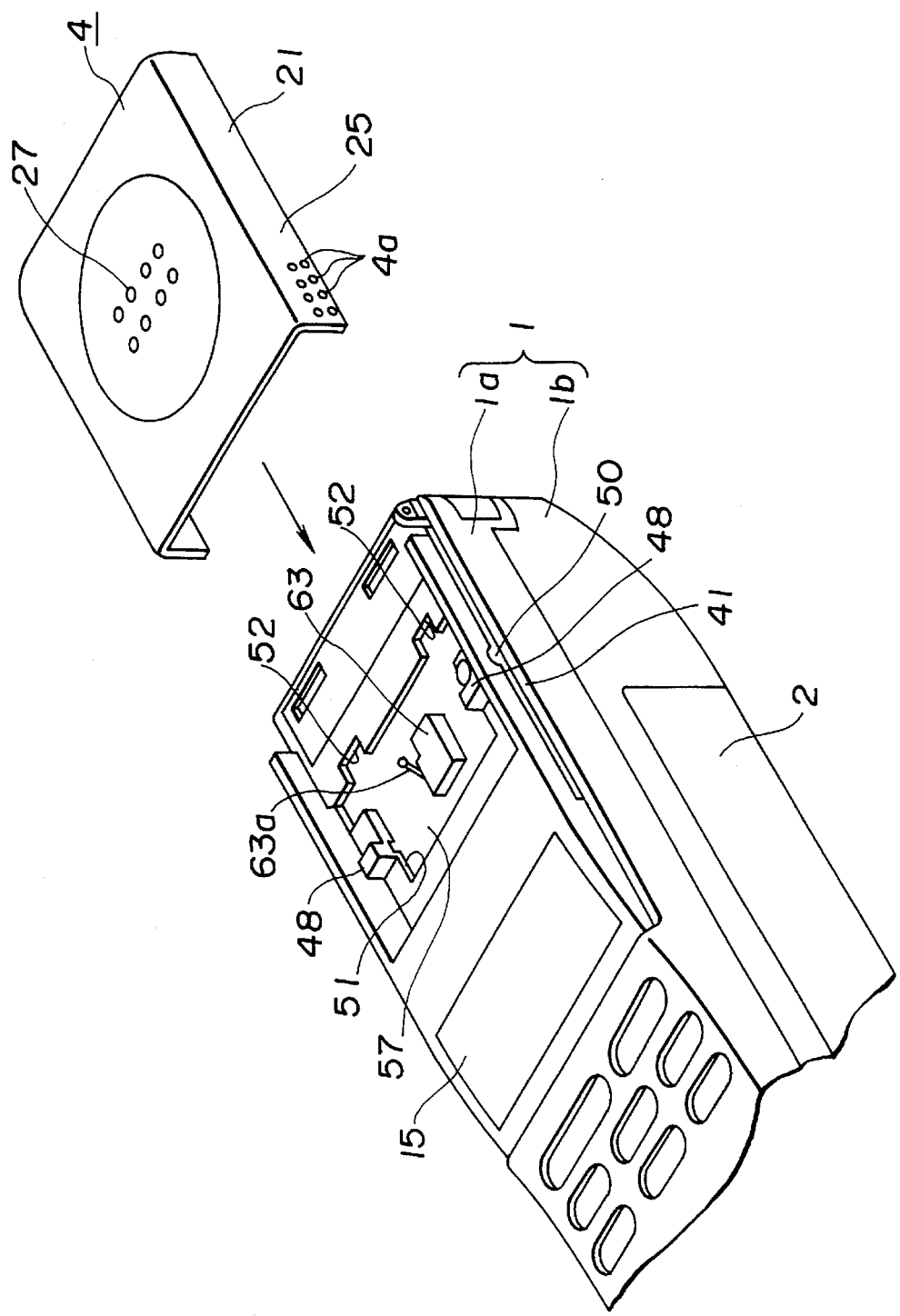
FIG. 12 is an exploded perspective view showing the speaker housing and a portion of the telephone main body having the speaker housing mounted thereon.

The speaker housing 4 and the telephone main body 1 are provided with a switching unit 55 for assuring electrical connection and disconnection between the receiving section of the telephone main body 4 and the speaker unit 3 responsive to the sliding operation of the speaker housing 4. The switching unit 55 is made up of a pair of probe pins 56 provided on the speaker housing 4 for movement in unison with the speaker housing and a pair of connection terminal plates 58 mounted on a printed circuit substrate 57 on which an electronic circuit, such as the above-mentioned receiving section, provided on the telephone main body 4, is laid, as shown in FIGS. 5, 9 and 11.

Figure 10:
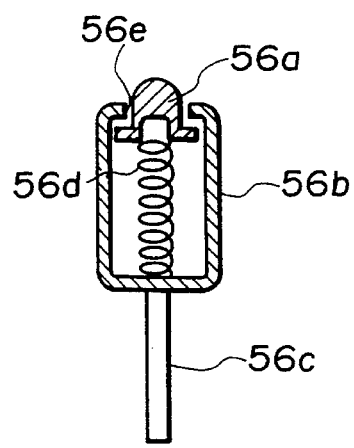
FIG. 10 is a cross-sectional view of a probe pin mounted on the speaker housing.

The probe pin 56 of the switching unit includes a container 56b housing a contactor 56a therein and having a connecting terminal 56c connected to a proximal end thereof, as shown in FIG. 10. The contactor 56a is biased by a coil spring 56d provided within the container 56b in a direction of being protruded at the distal end thereof out of an end opening 56e in the container 56. The probe pins 56 are fitted in mating grooves 60 formed in supporting blocks 59 formed on both proximal sides of the speaker unit retention plate 22 of the speaker housing 4, as shown in FIG. 4. The probe pins 56 are mounted in the supporting blocks 59 so that the contactors 56a biased by the coil springs 56d are thrust in a direction towards the distal end of the speaker housing 4 adapted to be projected out of the telephone main body 1, as shown in FIG. 9. The connecting terminals 56c of the probe pins 56 are connected to leads 61 from the speaker unit 3.

The connecting terminal plates 58 are each formed by punching and bending a sheet of electrically conductive resilient metal material, such as phosphor bronze.

Each connecting terminal plate 58 has a connecting plate section 58a at its proximal end for being electrically connected to a connection pattern formed on the printed circuit board 57 by a solder or the like. A terminal plate section 58b, contacted by a contactor 56a of the probe pin 56, is formed upright on one end of the connecting plate section 58a. The terminal plate section 58b is bent at 58c in a semicircular shape at a mid portion of the proximal part thereof for assuring positive elastic deflection of the terminal plate section 58b. The connecting plate section 58a is formed on both of its sides with snap-engaging sections 58d adapted for being snap-engaged in openings 62 formed in the printed circuit board 57.

The connecting terminal plates 58 are each mounted in position by engaging the snap-engaging sections 58d in the openings 62 in the printed circuit board 57, with the terminal plate sections 58b facing the contactors 56a of the probe pins 56, and by soldering the connecting plate sections 58a to the connecting patterns on the printed circuit board 57, as shown in FIG. 9, so that the connecting terminal plates 58 are electrically connected to a predetermined electrical circuit, such as the reception section, formed on the printed circuit board 57.

The connecting terminal plates 58 are mounted on the printed circuit board 57, in such a manner that, when the speaker housing 4 is receded towards the telephone main body 1 as shown in FIG. 9, the connection terminal plates are spaced apart from probe pins 56, whereas, when the speaker housing 4 is slid to a position of protruding out of the telephone main body 1 as shown in FIG. 11, the connection terminal plates are brought into pressure contact with the probe pins 56.

The speaker unit retention plate 22 of the speaker housing 4 is provided with a changeover unit 64 for actuating a control switch 63 provided on the printed circuit board 57 for controlling the operating modes of the present radiotelephone, as shown in FIG. 6. The changeover section 64 is formed by a rib on the proximal back side of the speaker unit retention plate 22. As the speaker housing 4 is slid relative to the telephone main body 1, the changeover section 64 causes a switch operator 63a of the control switch 63 to be rotated for changing over the radiotelephone to a desired one of predetermined operating modes.

If, with the above-described radiotelephone, the speaker housing 4 is in its receded position relative to the telephone main body 1, as shown in FIG. 1, the radiotelephone is held with the left hand by engaging the thumb at the retention 4a on the upstanding side plate 26 to cause the speaker housing 4 to be slid in the direction shown by arrow A in FIG. 1, the steel balls 45 of the holding mechanism of the speaker housing 4 are receded into recesses 48 by being thrust by the inclined surfaces of the first engaging grooves 46 to release the engagement of the steel balls 45 with the first engaging grooves 46 to permit the speaker housing 4 to be projected out of the telephone main body 1, as shown in FIG. 2. The distance L between the microphone unit 6 provided in the telephone main body 1 and the speaker unit 3 contained within the speaker housing 4 is increased to a spacing between the external ear and the mouth which is approximately equal to 13 mm.

When the speaker housing 4 is protruded relative to the telephone main body 1, the steel balls 45 are engaged in the second engaging grooves 47 so that the speaker housing 4 is protruded relative to the telephone main body, as shown in FIG. 6.

When the speaker housing 4 is slid in the direction of being protruded from the telephone main body 1, the contactors 56a of the probe pins 56 are contacted with the terminal plate sections 58b of the connection terminal plates 58, as shown in FIG. 11. Since the contactors 56a of the probe pins 56 are biased by the coil springs 56d in the direction of being protruded out of the container 56b, the resilient terminal plate sections 58b of the connecting terminal plates 58 are resiliently contacted with the contactors 56a. In this manner, positive contact may be established between the contactors 56a of the probe pins 56 and the terminal plate sections 58b of the connecting terminal plates 58 to assure reliable electrical conduction between the electrical circuitry of the speaker unit 3 and that provided within the telephone main body 1.

Also, when the speaker housing 4 is protruded relative to the telephone main body 1 to permit signal transmission and reception, the sound radiating holes 35 formed in the back side of the speaker housing 4 are exposed to outside, as shown in FIG. 3. Consequently, when the speaker unit 3 is actuated in the state of signal transmission and reception, the sound may be radiated and dissipated out of the speaker housing 4 from the back side of the speaker unit 3 to realize satisfactory voice reproduction.

The manner of employing the above-described radiotelephone according to the present invention is hereinafter explained.

Figure 13:
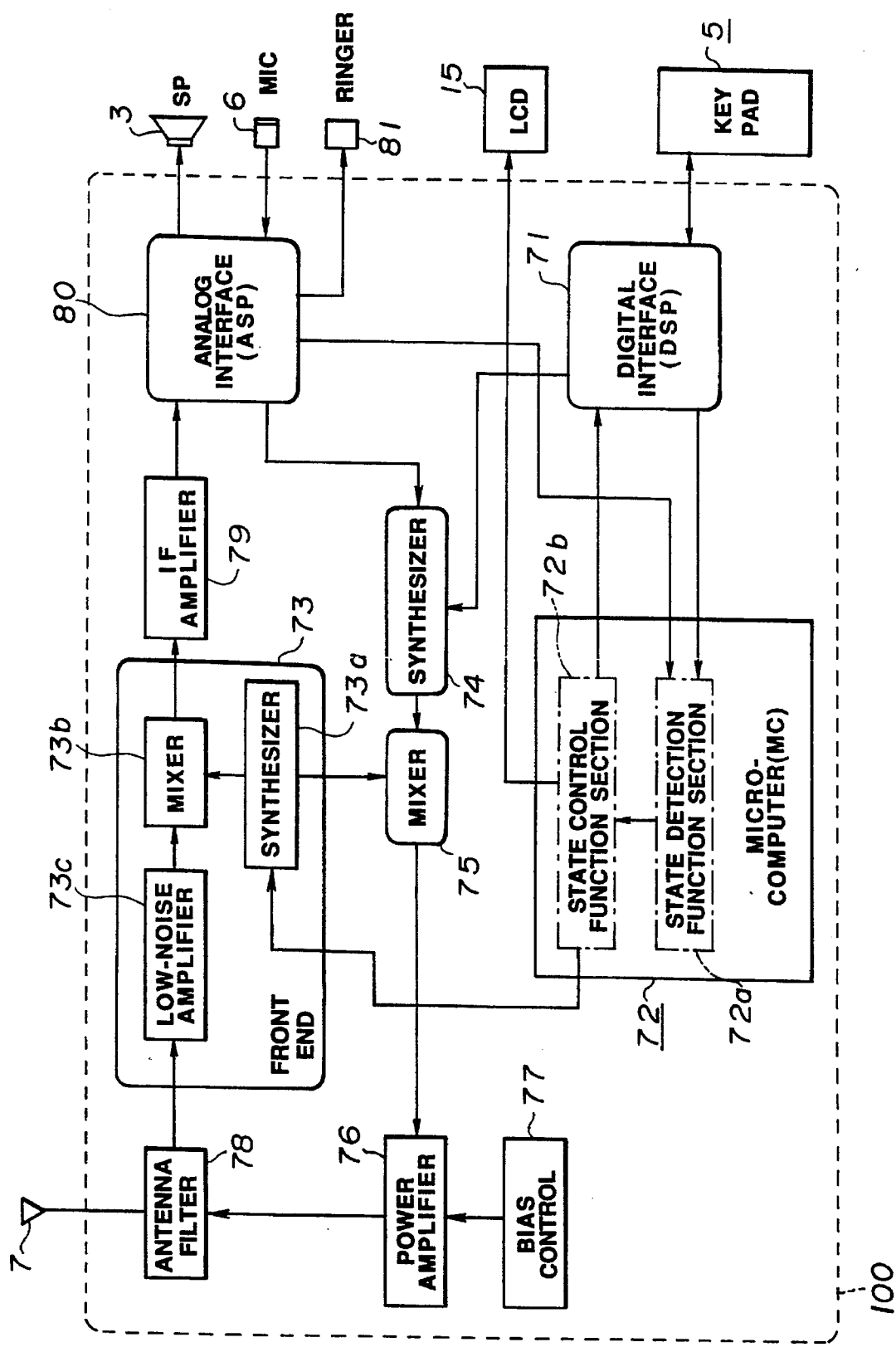
FIG. 13 is a block circuit diagram showing a transmission/reception circuitry of the radio telephone according to the present invention.
Figure 14:
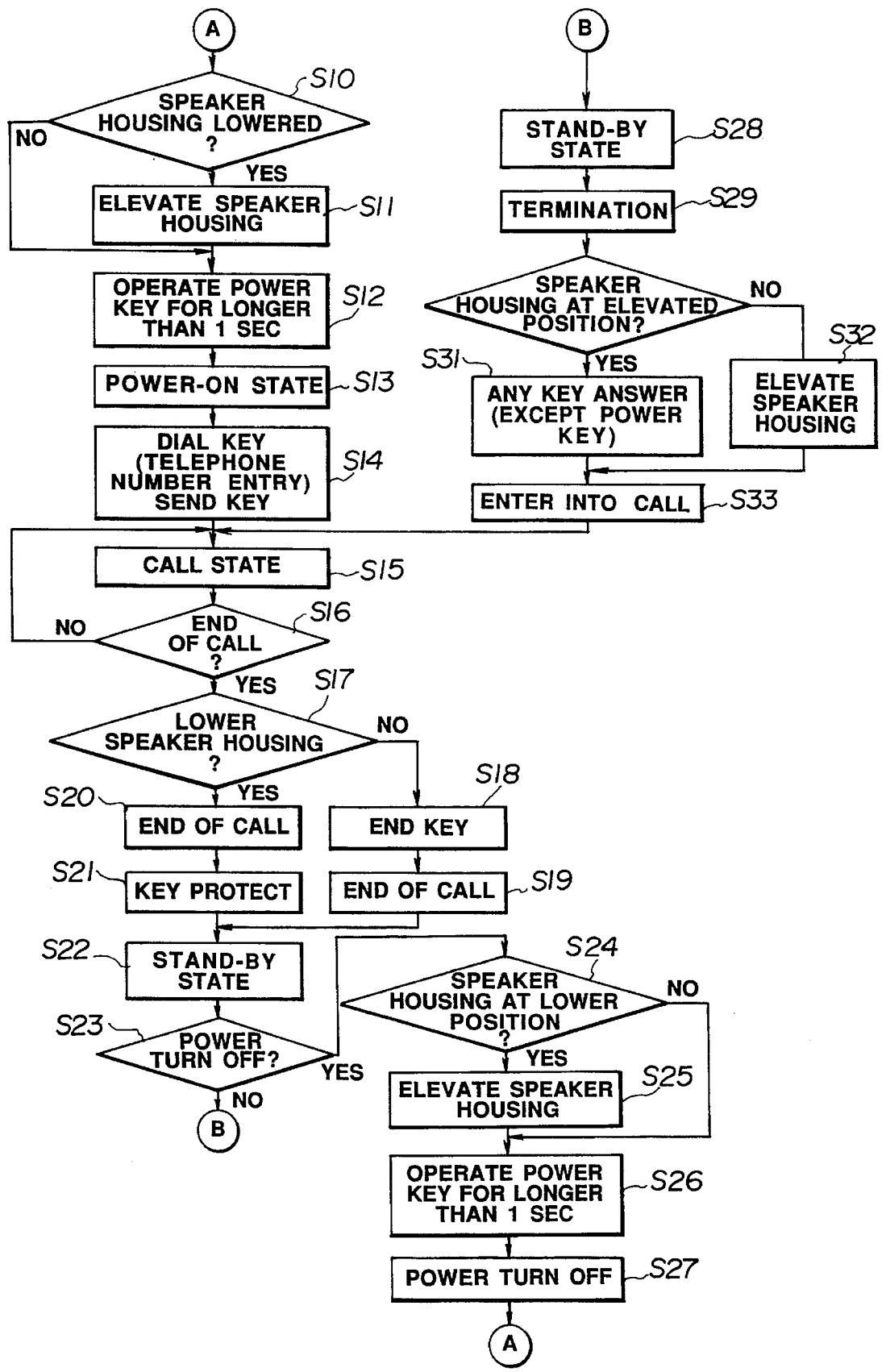
FIG. 14 is a flow chart for illustrating the operational sequence for the radiotelephone according to the present invention.

The radiotelephone has a transmission/reception circuitry 100, shown in FIG. 13, enclosed within the telephone main body 1. A micro-computer 72 is provided within the transmission/reception circuit 100. It is by this micro-computer 72 that the processing according to the flow-chart shown in FIG. 14 is carried out.

At step 10, it is decided whether or not the speaker housing 4 has been lowered towards the telephone main body 1, with the power source turned off.

If the result is YES, that is if the speaker housing 4 has been lowered, the speaker housing is raised at step S11, before the micro-computer 72 proceeds to step S12.

If the speaker housing has not been lowered, micro-computer 72 proceeds directly to step S12.

At step S12, power key 14 is pressed for more than 1 sec. By the power key actuation, a signal indicating the power on state is supplied via a digital interface (DSP) 71 to a state detection unit 72a within the micro-computer 72.

At step S13, the power is supplied from the battery pack 2 to various parts of the radiotelephone so that a signal indicating the power source on state is detected by a state detection unit 72a which then outputs a detection signal to a state control section 72b. The state control section 72b supplies a control signal corresponding to the power source on state to a liquid crystal display (LCD) 15 to display the power source on state.

If the speaker housing 4 is slid to a raised position protruding relative to the telephone main body 1, the probe pins 56 come in contact with the connection terminals 58, as explained previously, so that reception signals may now be transmitted to the speaker unit 3.

At step S14, dial keys 9 are actuated at the key pad section 5 by way of entering a telephone number. The telephone number entered is transmitted as a control signal by the transmitting key 12. The Control signal, transmitted in this manner, is modulated by a modulator 74 via digital interface section 71. The signals thus modulated are transmitted to a mixer 75. A predetermined frequency is supplied to mixer 75 from synthesizer 73a for mixing with the modulated signal. The mixer 75 transmits the mixed signals to a power amplifier 76 and thence to antenna 7 via an antenna filter 78 for transmission on air. The power amplifier 76 is bias-controlled by a bias controlling section 77.

When the call state is established so that telephone conversation may be had with the called party, the voice from the microphone unit 6 is transmitted at the step S15 at the transmission/reception antenna 7 via analog interface section 80, modulator 74, mixer 75, power amplifier 76 and antenna filter 78.

After the call comes to a close, it is decided at step S16 whether the call should be halted. If the result of decision is NO, that is if the call should not be halted, micro-computer 72 reverts to step S15. If otherwise, that is if the call should be halted, micro-computer 72 proceeds to step S17.

At step S17, it id decided whether or not the speaker housing 4 has been lowered towards the telephone main body 1. If the speaker housing 4 has not been lowered (NO), micro-computer 72 proceeds to step S18 to cause the transmission/reception end key 13 of the key pad section 5 to be pressed. The call is subsequently halted at step S19, before micro-computer 72 proceeds to step S22.

If the speaker housing 4 has been lowered towards the telephone main body 1 (YES), call is halted at step S20, before micro-computer 72 proceeds to step S21. At this time, the contact so far established between the probe pins 56 on the side of speaker housing 4 and the connecting terminal sections 58 on the side of telephone main body 1 is dissolved to interrupt supply of reception signals to the speaker unit 3. When the speaker housing 4 is lowered towards the telephone main body 1, the control switch 63 provided on the telephone main body 1 is changed over by a control switch changeover section 64 provided on the speaker housing 4. Since the control switch 63 is controlled, a key protecting operation or disabling the keys of the key pad section 5 is carried out at step S21, before micro-computer 72 proceeds to step S22. It is noted that a ringer 81 is caused to ring whenever a termination is made.

At step S22, micro-computer 72 transmits a signal indicating a standby state to each part of the radio telephone.

At step S23, power key 14 is actuated to decide whether or not the power-off state exists. If the result of decision is NO, that is if the power source has been turned on, the stand-by state is established. Conversely, if the power key 14 is pressed so that the power source is turned off, that is if the result of decision is YES, micro-computer 72 proceeds to step S24.

At step S24, a decision is made as to whether or not the speaker housing 4 has been lowered towards the telephone main body 1. If the result of decision is NO, that is if the speaker housing 4 is not lowered towards the telephone main body 1, micro-computer 72 proceeds to step S26. Conversely, if the result of decision is YES, that is if the speaker housing 4 has been lowered, micro-computer 72 proceeds to step S25 to raise the speaker housing 4, before micro-computer 72 proceeds to step S26.

At step S26, power key 14 in the key pad section 5 is pressed for longer than 1 sec before micro-compute 72 proceeds to step S27.

At step S27, power supply to each component is interrupted and a signal indicating the power source off state is supplied via digital interfacing section 71 to micro-computer 72 which then erases out the display on the liquid crystal display LCD 15 via state detection unit 72a and state control section 72b.

On the other hand, with the standby state at step S28, synthesizer 73a is maintained in an actuated state to effect scanning. If reception signals are entered to transmission/reception antenna 7, these signals are supplied to a front end section 73 via an antenna filter 78. This front end section 73 is made up of a synthesizer 72a, mixer 72b and a low noise amplifier 72c. The reception signals are supplied via low-noise amplifier 72c and resulting amplified signals are supplied to mixer 72a, to which an intermediate frequency (IF) for down-conversion of input signals is also supplied. Mixer 72a outputs the down-converted signals to an IF amplifier 79 which amplifies the supplied signals to ring a ringer from a ring-back tone generator 8 via analog interfacing unit 80. The analog interfacing unit 80 transmits a signal indicating the state of termination to state detection section 72a within the micro-computer 72 to supply the signal of the detected state to state control section 72b to display the termination on the liquid crystal display (LCD) 15.

After the terminating operation corresponding to the state of termination is made, micro-computer 72 proceeds to step S30.

At step S30, a decision is made as to whether or not the speaker housing 4 is in the state of being raised relative to the telephone main body 1. If the speaker housing 4 is in the raised state (YES), micro-computer 72 proceeds to step S31 to cause the keys other than the power key 14 in the key pad section 5 to be thrust. If the speaker housing 4 is not in the state of being raised relative to the telephone main body 1 (NO), micro-computer 72 proceeds to step S32 to raise the speaker housing 4. Micro-computer 72 proceeds to step S33 to enter into call before proceeding to step S15.

Since the above-described portable radiotelephone according to the present invention is designed so that the distance between the speaker unit contained in the speaker housing and the microphone unit contained in the telephone main body may be changed by sliding the speaker housing relative to the telephone main body, the radiotelephone may be reduced in size while maintaining a sufficient mounting strength of the speaker housing relative to the telephone main body.

Also, the electrical connection and disconnection between the speaker unit and the telephone main body may be achieved by sliding the speaker housing relative to the telephone main body and, above all, when the speaker housing has been lowered relative to the telephone main body, the electrical disconnection between the speaker unit and the telephone main body may be achieved reliably.

Besides, since the control switch controlling the operating mode of the radio telephone is operated by sliding the speaker housing relative to the telephone main body, a desired operating mode may be selected depending on the position of the speaker housing relative to the telephone main body, with the result that a portable radiotelephone with satisfactory operability may be achieved.

What is claimed is:

1. A portable radiotelephone comprising a telephone main body having a key pad section mounted on an outer surface thereof and having a microphone unit contained therein, a speaker housing having a speaker unit contained therein, the speaker housing being slidably mounted on the telephone main body to provide for a variable distance between the microphone unit and the speaker unit, and switching means provided between the telephone main body and the speaker housing for assuring electrical connection and disconnection of the speaker unit depending on a sliding movement of the speaker housing relative to the telephone main body.

2. The portable radiotelephone as claimed in claim 1 wherein electrical contact of the switching means is established when the speaker housing is slid relative to the telephone main body to increase the distance between the microphone unit in the telephone main body and the speaker unit in the speaker housing for establishing electrical contact of the speaker unit to the telephone main body.

3. The portable radiotelephone as claimed in claim 2 wherein the switching means is provided on the speaker housing and on the telephone main body.

4. The portable radiotelephone as claimed in claim 1 wherein changeover means for changing over a control switch provided in the telephone main body is provided on the speaker housing.

5. A portable radiotelephone comprising:

a telephone main body having a key pad section mounted on the outer surface thereof and having microphone unit contained therein, a speaker housing having a speaker unit contained therein, the speaker housing being slidably mounted on the telephone main body to provide for a variable distance between the microphone unit and the speaker unit, and a control section comprising a control switch for placing the radiotelephone in a call state when the speaker housing is in a cell position, the speaker being electrically connected to receive signals when the radiotelephone is in the cell state, and placing the the radiotelephone in a standby state when the speaker housing is in a standby position, the speaker unit being electrically disconnected from receiving data when the radiotelephone is in the standby state.

6. The portable radio telephone according to claim 1, wherein the switching means includes a probe pin attached to the speaker housing and a connecting terminal plate attached to a printed circuit board located within the telephone main body.

7. A portable radiotelephone as set forth in claim 5 wherein the control switch also disables the key pad section when the speaker housing is in the standby position.

8. A portable radiotelephone as set forth in claim 7 wherein the control switch is switched between the call state and the standby state by a rib formed within the speaker housing.

* * * * *

UNITED STATES PATENT AND TRADEMARK OFFICE
CERTIFICATE OF CORRECTION

PATENT NO.   : 5,461,672
DATED        : October 24, 1995
INVENTOR(S)  : Kazuhiro Enokido, et al.

It is certified that error appears in the above-indentified patent and that said Letters Patent is hereby corrected as shown below:

In col. 12, line 63, change "cell" to "call".

In col. 12, line 65, change "cell" to "call".

Signed and Sealed this

Twenty-seventh Day of February, 1996

Attest:

BRUCE LEHMAN

Attesting Officer                Commissioner of Patents and Trademarks